Jan. 15, 1963  R. B. GORDON ETAL  3,072,982
METHOD OF PRODUCING SOUND AND HOMOGENEOUS INGOTS
Filed July 13, 1953
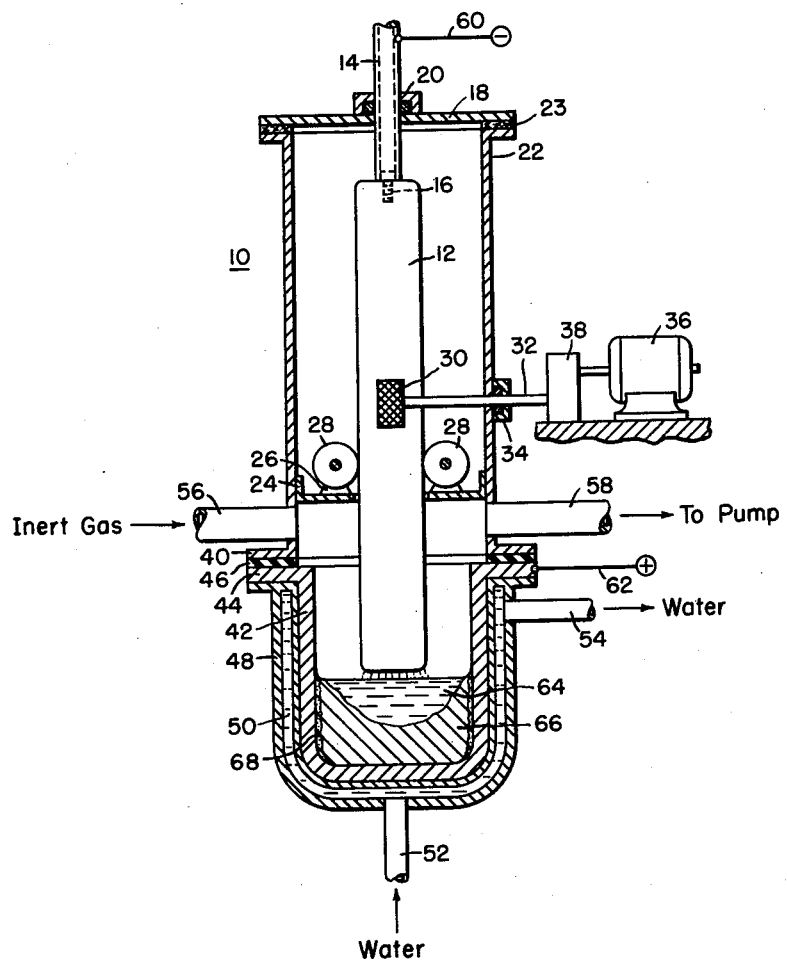
INVENTORS
Robert B. Gordon &
Walter J. Hurford.
BY
Frederick Shapoe
ATTORNEY United States Patent Office 3,072,982
Patented Jan. 15, 1963

3,072,982
METHOD OF PRODUCING SOUND AND HOMOGENEOUS INGOTS
Robert B. Gordon and Walter J. Hurford, Pittsburgh, Pa., assignors to Westinghouse Electric Corporation, East Pittsburgh, Pa., a corporation of Pennsylvania
Filed July 13, 1953, Ser. No. 367,524
12 Claims. (Cl. 22—200)

This invention relates to a process for producing sound, clean and homogeneous ingots of refractory and easily oxidizable metals and alloys thereof.

Considerable difficulties have been encountered in producing sound, clean and homogeneous ingots from the refractory and easily oxidizable metals and alloys thereof, such, for example, as titanium, zirconium, uranium and vanadium, and various alloys thereof. These metals in particular react readily with oxygen and nitrogen to form compounds which are extremely difficult to decompose in order to remove the anion component thereof. In the process of preparing ingots from these elements and their alloys by the most meticulous procedures known to the art, there are inevitably produced ingots whose surfaces are thickly contaminated with oxides and other impurities, such, for example, as the salts that may have been employed in producing the metals. The interior of the ingots is usually porous and contains much entrapped gases. The alloys of these elements show considerable variations in composition from point to point along the ingots. At the present time, for subsequent processing, the accepted procedures involve the removal of a large portion of the cast ingots, particularly at the surfaces, which portions are discarded. The core of such ingots is often rolled or worked into bars or rods in order to homogenize the composition and to reduce the porosity. Such bars or rods are then cut or otherwise reduced to small particles and remelted in an arc melting furnace into a usable ingot of reasonably sound structure. However, these ingots, though more homogeneous than the first ingots, are contaiminated from gases picked up during fabrication for remelting and the products made therefrom vary considerably in their properties.

The object of this invention is to provide a process whereby sound, clean ingots of a high degree of homogeneity are produced by a simple process involving two successive arc melting operations with substantially no waste of the metal being made into the final ingot.

A further object of the invention is to provide a process for arc melting refractory, easily oxidizable metals and their alloys by arc melting compacts of the metals into an initial ingot and then again arc melting the initial ingot whereby a second ingot is produced with an unusually sound, clean and highly homogeneous condition.

Other objects of the invention will, in part, be obvious and will, in part, appear hereinafter.

For a better understanding of the nature and objects of the invention, reference should be had to the following detailed description and drawing, in which the single FIGURE is a vertical cross-section through an arc melting furnace employed in the practice of the invention.

We have discovered a simple process for producing sound, clean and highly homogeneous ingots from refractory and easily oxidizable metals, which are usually in the form of powder or sponge as a result of reduction from the oxide or other compound thereof, by arc melting the metals as a consumable electrode in an inert atmosphere or vacuum to produce an initial ingot, and then employing said initial ingot as a consumable electrode in a second arc melting operation also in an inert atmosphere or under vacuum, whereupon the second arc melting produces a final ingot having the desired properties. The use of the first ingot as the electrode in such second arc melting process produces a most unexpected improvement in the product. All intermediate processing with attendant waste and scrap as required heretofore, is completely eliminated. Furthermore, ingots of any size or shape may be produced readily by employing the two arc melting steps in succession.

At the present time, a typical refractory and easily oxidizable metal is zirconium which is obtained in the form of sponge from certain well known reduction processes. The process of this invention will be described by reference to zirconium but it will be understood other metals may be similarly processed. The sponge zirconium is pressed into compacts at pressures of the order of 40,000 p.s.i. (pounds per square inch). These compacts may be in the form of bars a foot long and of a cross-section of 2 inches by 2 inches. In order to employ these relatively small compacts in arc casting processes for producing large ingots, a number of the compacts may be assembled together by tack welding them at several points while in an inert atmosphere, such, for example, as argon. By such welding procedures, a composite electrode member may be prepared which may be 4 feet long by 4 inches by 4 inches in cross-section. If a press of sufficient capacity is available, a large compact may be prepared as a single bar to begin with. The compacts produced from zirconium sponge usually contain a substantial proportion of salts, such as magnesium chloride, magnesium, and metal oxides, such as zirconium oxide, present along with small amounts of entrapped nitrogen and other gases.

In order to prepare an ingot from an electrode member comprising one or more of the compacts of zirconium, the electrode member is arc melted in a chamber 10 as shown in the drawing, wherein the electrode member 12 comprises the zirconium compacts. The member 12 is supported at its upper end by a hollow holder 14 affixed to the upper end thereof as by suitable threading 16. The holder 14 may be cooled by circulating water therethrough. The holder 14 passes through a cover 18 provided with a relatively gas-tight sealing gland 20 surrounding the holder 14 to permit vertical movement thereof without permitting any substantial leakage of gases therethrough. The cover 18 is affixed to a cylinder casing 22 with an interposed gasket 23 to produce a hermetically sealed chamber. Adjacent the lower portion of the interior of the cylinder casing 22 is an apertured shelf 24 provided with brackets 26 on which are mounted rollers 28 for guiding movement of the electrode 12 therethrough in a vertical direction. At right angles to the axis of the rollers 28 are disposed drive rollers 30 fitting tightly against the sides of the electrode member 12. The drive rollers 30 are operable by a shaft 32 passing through a hermetic, low friction, sealing gland 34 on the casing 22. A motor 36 operating through a gear box 38 is adapted to control the rotation of shaft 32 and thereby control the rate of rising or lowering of the electrode member 12.

The lower end of the cylinder casing 22 is provided with a flange 40 which is detachably connected to a flange 44 of an ingot mold 42. An electrically insulating gasket 46 is interposed between the flanges 40 and 44. The ingot mold 42 is disposed to fit the walls of a jacket 48 provided with a hollow space 50 to receive a cooling medium. We have found that a suitable cooling medium is water, though gases and other fluids may be employed. Thus, water may be admitted to the space 50 of the jacket 48 through an inlet 52 disposed at the bottom thereof, and the water vented through an outlet 54 at the upper portion.

The cover 18, cylinder casing 22 and ingot mold 42 cooperate to form a closed chamber. In this chamber there is provided a suitable inert atmosphere. The inert atmosphere may either comprise a low vacuum or a purified inert gas substantially free from any oxygen, water vapor or other materials reactive with the molten refractory metal to be made into an ingot. Thus, argon or helium gas may be introduced into this chamber through an inlet 56 and withdrawn through a gas outlet 58 to a suitable vacuum pump or the like. If a vacuum is to be applied to the system, the inlet 56 is closed, and the outlet 58 is connected to vacuum pump which maintains the interior of the cylinder 22 at a low pressure of the order of a few microns.

The holder 14 is connected to the negative terminal 60 of a suitable source of direct current, for example, a direct current generator or a rectifier. The ingot mold 42 is connected to the positive terminal 62 of the same source of electrical power. The ingot mold 42 comprises a metal, such as copper, or other material that will conduct electrical current without materially contaminating the refractory metal being melted. It may be desirable to dispose a nugget or button of the refractory metal at the bottom of the mold 42 to facilitate the arc melting operation. In order to initiate the arc melting, the motor 36 is operated to lower the electrode member 12 until an arc is struck between the lower end or tip thereof, and the bottom of the ingot mold or the button of the metal present therein. Then the electrode member 12 is properly positioned by operation of the motor 36 so that the electrode member 12 progressively melts from the lower end upwardly and deposits molten metal within the ingot mold 42. By reason of the circulation of water through the space 50, the ingot mold is cooled so that the molten metal rapidly solidifies to produce a solid ingot 66 with only a small pool 64 of molten metal being present adjacent the electrode end. When the ingot mold has been substantially completely filled, the electrode 12 is withdrawn a substantial distance from the pool 64, the flow of current being interrupted, and the entire initial ingot 66 permitted to solidify.

The initial ingots produced by melting compacts of a refractory, easily oxidized metal, such as zirconium, for example, will be found to be quite porous and unsound. The surface 68 is contaminated to a substantial distance with salts and oxides and the like. The result of this initial arc melting step does not produce an ingot that may be satisfactorily formed into commercially usable products. Also, there is a limit to the diameter of the ingot 66 depending on the lateral dimensions of electrode member 12.

The practice in the art has been, first, to machine off the surface layer 68, which layer is then discarded. In a 12 inch diameter ingot of zirconium, approximately an inch of the outer surface may be removed, leaving approximately a 10 inch core or body. This 10 inch body is rolled into a bar, strip, or rod which is then cut into small pieces and these pieces are remelted. However, the process of rolling and cutting up exposes a large surface area to the atmosphere while hot and this results in more nitrides and oxides with resulting wastage and loss of the metal. Such small pieces when arc melted produce an ingot that still has considerable unsoundness and is contaminated with the gas picked up on the surface during fabrication for remelting.

In accordance with this invention, we have discovered that the initial ingot 66 produced by this first arc melting operation need not be machined and rolled at all, or at most only the surface layer 68 removed, but the entire solid ingot 66 is employed as an electrode in an arc melting operation which duplicates the one just described with the electrode 12. It is preferable to use a vacuum in this second melting operation. During this second arc melting operation, we have found that the surface oxides and impurities tend to volatilize almost completely and are withdrawn through the outlet 58 along with any gases that may have been present in the pores throughout the ingot 66. A much larger diameter ingot may be cast during this second process. For example, the original electrode bar may comprise a pressed compact welded together to form an electrode of say 4 inches by 4 inches in cross-section, and the ingot 66 produced therefrom may be 7 inches in diameter. This 7 inch diameter ingot is then readily arc melted by the same procedure to produce an 11 inch or 12 inch diameter ingot. In many instances, it is highly desirable to produce large diameter ingots inasmuch as they enable the preparation of larger slabs and sheets of the metal than may be produced from small diameter ingots.

During the second arc melting operation, as applied to the initial arc melted ingot, a very high proportion of the impurities originally present are withdrawn. There is no opportunity for additional oxidation or impurities to be built up on the surfaces of the metal as occurs when the first ingot is converted into strip or rod and then cut into little pieces. The second ingot is amazingly different from and superior to the first arc melted ingot. Thus, where the first melted ingot has a surface that lacks any metallic appearance, the surface of the second ingot is of clean, bright metallic luster. The second ingot is free from pores and blow holes due to occluded gases. Furthermore, the structure of the metal is far more uniform and superior. In addition, alloys of refractory, easily oxidized metals are exceptionally homogeneous. In one instance, first ingots prepared from zirconium alloyed with 2.5% of tin exhibited a standard deviation of tin content varying from 0.13 to 0.18%. A 7 inch diameter ingot of such properties when remelted by the arc melting procedure into a 12 inch ingot exhibited a standard deviation of tin content of 0.03% to 0.10%. This is a substantial improvement. The second ingot may be arc-melted a third time, but the improvement in quality is slight as compared to that secured between the first and second arc-melting steps. However, the third ingot may be of very large diameter.

It will be appreciated that the apparatus shown in the drawing is exemplary of the invention and not limiting since it may be greatly modified within the teaching of the present invention. While the electrode 12 has been disclosed as comprising compacts produced by pressing operation, it will be understood that the metal may be melted by other means, such as in an induction furnace, and cast into a rough electrode which may be arc melted as disclosed herein to produce sound, clean ingots.

While we have secured outstanding results by employing direct current, it will be appreciated that alternating current, as well as direct current with superimposed alternating current, may be applied to melt the consumable electrodes of the metal which is to be cast into ingots.

We have melted ingots of uranium, zirconium and their alloys, as well as other metals, by the process of the present invention and in every instance have secured ingots of exceptional homogeneity and soundness. In certain instances, we have been able to use a lower grade sponge zirconium than would be acceptable in practicing process known heretofore, inasmuch as the present invention enables a high degree of purification of the metal by the double arc melting process. In some instances the initial ingot may be prepared by melting lumps or other rough shapes of zirconium, for example, by disposing these lumps in the vicinity of an electrical arc produced between nonconsumable electrodes of tungsten, graphite or the like, in an inert atmosphere. The resulting initial ingot can be used as a consumable electrode and melted into a second ingot as disclosed herein.

We have tack welded a number of crystal bars of a metal, such as uranium crystal bars, into a consumable electrode and arc-melted the initial ingot therefrom.

It will be understood that the process may be applied to numerous other metals than those disclosed herein with the considerable benefits obtained as described herein.

We claim as our invention:

1. In the process of preparing sound and highly homogeneous ingots from easily oxidized refractory metals, the steps comprising preparing an electrode of the refractory metal, placing an end of the prepared electrode within a cooled mold, passing an electrical current between the electrode and the mold whereby the electrode is progressively melted from said end and is deposited in the bottom of the mold, the molten metal deposited in the mold progressively solidifying to build up an ingot, the melting of the electrode being carried out in the absence of a reactive gas, the resulting solidified ingot characterized by a relatively poor, contaminated surface and inhomogeneity, thereafter employing the entire resulting ingot as a second electrode and remelting only such ingot into a second ingot under similar conditions to the preparation of the first ingot whereupon the second ingot is characterized by a clean surface relatively free from contaminations and the metal in the ingot is highly homogeneous.

2. The process of claim 1 wherein the second ingot is of substantially greater diameter than the first ingot.

3. The process of claim 1 wherein the surface of the first ingot is removed prior to the step of remelting it to form the second ingot.

4. The process of claim 1 wherein the first electrode is prepared by compacting particles of the refractory metal under high pressure.

5. The process of claim 1 wherein the arc melting of the second ingot is carried out under vacuum.

6. In the process of preparing a clean, sound and highly homogeneous ingot of a metal from a first arc-cast ingot having a thick contaminated surface and lacking homogeneity and soundness, the step comprising employing the solid arc-cast first ingot as an electrode and arc melting the first ingot alone in a cooled mold, the mold forming the other electrode, the arc-melting being carried out under vacuum, whereby such arc-melting deposits only the metal from the first ingot into said mold and produces therein a clean surfaced ingot which is sound and highly homogeneous.

7. The process of claim 6 wherein only the surface of the first ingot is removed prior to arc-melting thereof.

8. The process of claim 6 wherein the arc-melting is carried out in an atmosphere comprising a stream of inert gas.

9. The process of producing large, sound and homogeneous ingots of zirconium from zirconium sponge, the steps comprising pressing the zirconium sponge under pressures of the order of 40,000 p.s.i. into an electrode bar, placing one end of the electrode bar within a closed chamber having a cooled ingot mold at the bottom thereof, the chamber being provided with a non-reactive atmosphere, making the ingot bar the negative electrode and the ingot mold the positive electrode, striking an arc between the ingot mold and the end of the electrode bar and passing an electric current therebetween, thereby progressively melting the electrode bar and depositing molten zirconium within the ingot mold, the molten zirconium in the cooled ingot mold progressively solidifying, thereby building an ingot within the ingot mold, the resulting ingot being characterized by a thick contaminated surface, unsound structure and inhomogeneity of the zirconium, withdrawing the unsound ingot of zirconium from the ingot mold, disposing the solid unsound ingot of zirconium as the sole meltable component in a closed arc-melting chamber having a cooled ingot mold at the bottom thereof, the arc-melting being carried out in the absence of a reactive gas, making the unsound ingot the negative electrode and the ingot mold the positive electrode, striking an arc between the ingot and the ingot mold and passing an electric current therebetween, thereby progressively melting only the unsound ingot and depositing molten zirconium metal derived exclusively from the unsound ingot in the ingot mold, the molten zirconium so deposited progressively solidifying into a second ingot having a clean surface and being sound and highly homogeneous.

10. The process of claim 9 wherein the second arc-melting is carried out under vacuum.

11. The process of claim 9 wherein titanium is being treated instead of zirconium.

12. The process of claim 9 wherein an alloy of zirconium is being treated.

References Cited in the file of this patent

UNITED STATES PATENTS

| | | |
|---|---|---|
| 1,555,313 | Rohn | Sept. 29, 1925 |
| 2,541,764 | Herres et al. | Feb. 13, 1951 |
| 2,640,860 | Herres | June 2, 1953 |
| 2,676,882 | Hatch | Apr. 27, 1954 |
| 2,686,822 | Evans et al. | Aug. 17, 1954 |

FOREIGN PATENTS

| | | |
|---|---|---|
| 358,563 | Great Britain | Oct. 12, 1931 |